Jan. 26, 1932.  J. E. BROWNING  1,842,581
FIREARM
Filed Sept. 15, 1930  6 Sheets-Sheet 1

Inventor
Jonathan E. Browning.
By R. T. Bryant
Attorney Jan. 26, 1932. J. E. BROWNING 1,842,581
FIREARM
Filed Sept. 15, 1930 6 Sheets-Sheet 3

Inventor
Jonathan E. Browning.
By
Attorney

Inventor
Jonathan E. Browning.

Patented Jan. 26, 1932

1,842,581

UNITED STATES PATENT OFFICE

JONATHAN E. BROWNING, OF OGDEN, UTAH, ASSIGNOR TO J. E. BROWNING COMPANY, OF OGDEN, UTAH

FIREARM

Application filed September 15, 1930. Serial No. 482,033.

The present invention relates to repeating firearms in general but more particularly to repeating shot guns.

One object of my invention resides in a simple and easily detachable connection between the breech frame or carrier on the one hand and the barrel and the magazine on the other hand.

Another object of the invention is to provide the frame or carrier with a loading opening in the bottom and an ejector opening on one side, preferably the right, while the other side and the top remain solid. The ejectors are also designed to swing the empty shell out with its mouth first.

Another novel feature resides in the action rod connection with the breech bolt or block.

Other novel features are a cam action in the form of operator; an inertia piece for automatic operation; a breech slide with beveled side edges or cams cooperating with similar faces on the breech block.

Other important developments and improvements will be understood from the following description and the accompanying drawings.

In the accompanying drawings one embodiment of the invention has been illustrated.

In the several figures of the drawings the same reference characters refer to the same parts.

In first describing the very simple and secure locking device between the receiver and the barrel and magazine unit, reference is made to Figs. 1, 2, 3, 4, 5, 15, 16, 17, 20, 21, 22, 23, 24, 25 and 26.

Reference numeral 40 denotes the gun barrel, 41 the magazine, 42 the frame or receiver secured in the usual manner to the stock 43. The forward end of the receiver 42 is provided with sockets 44 and 45 having interrupted threads in order to receive respectively the correspondingly threaded rear ends of the barrel 40 and the magazine 41. The barrel has a reinforcement band 46 where the threads terminate with an abutment surface 47 adapted to rest against the front edge of the receiver 42 when the parts are assembled. In this position the magazine 41 locks the barrel from turning in its socket 44. The magazine 41 after having been given a quarter turn is adapted to be drawn forward as will be described further on. To guide the magazine in its sliding motion, a forward extension or sleeve 48 surrounding the magazine is provided on the lower portion of the abutment band 46, thus preventing the magazine from dropping out of the band.

The forward end of the magazine 41 which is tubular is slidably and revolubly supported by a clip 49 secured under the gun barrel 41. For this purpose a small shoulder 50 is formed on the under side of the barrel and having end surfaces radially directed from the barrel around which grip the jaws 51 drawn together by a clamp screw 52, see particularly Figs. 20, 21, 22, 23, 24, 25 and 26, said jaws reaching each less than a quarter circle around the barrel.

Figure 20:
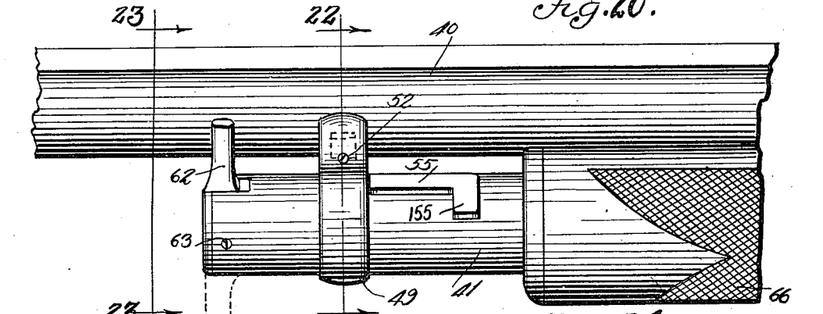
Fig. 20 is a fragmentary left side elevation of the barrel and forward end of the magazine showing the latch device for the same in locked position.

The magazine 41 is provided with an L-shaped key 55 with its long shank parallel to the axis of the magazine, Fig. 20 and the short shank to the rear.

In assembled position of the parts, when the threaded rear end of the magazine tube 41 is in full engagement with the threads in the socket 45, then the forward end of the long key shank abuts against the rear face of the clip thereby preventing axial displacement, Fig. 20. The magazine tube contains the usual coiled spring 56 with capped ends as at 57 and 58. The rear cap 58, when the magazine is loaded, abuts against the front edge of the nearest cartridge case in order to push it rearward, but when the magazine is empty the cap 58 abuts against a shoulder 60 formed near the rear end of the bore of the tube. The coiled spring 56 reacts through its front cap 57 against a flat sided latch plate 61 with a projecting finger 62, see Figs. 20, 21, 23, 24 and 25. This latch plate fits in a plug 64 which is secured in place in the front end of the magazine tube 41 by a screw 63 which serves as a journal pin for the latch plate. The edge of the tube is slotted on opposite sides so that the finger 62 may be swung 180° on its pin and project radially in opposite directions. In Fig. 20 the finger 62 is seen pointing upward and resting against the side of the barrel 40, while at the same time the front end of the key 55 abuts against the rear face of the clip 49, thus the magazine tube 41 is not only prevented from unturning in the socket 45 but also from forward axial displacement.

Figure 21:
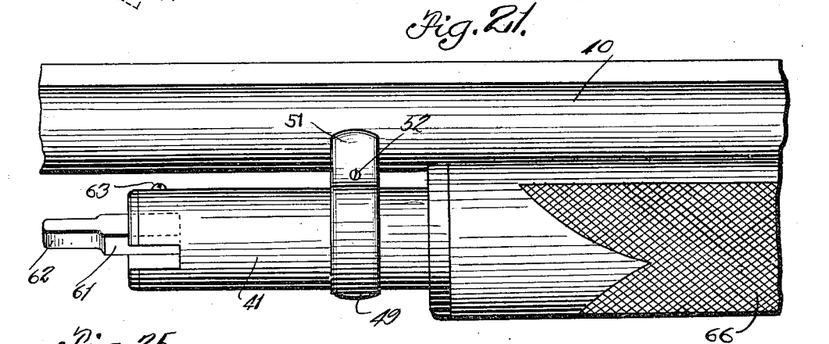
Fig. 21 is an elevation similar to Fig. 20 with the latch unlocked and the magazine turned and drawn forward ready for detaching the barrel and the magazine from the frame or receiver.
Figure 22:
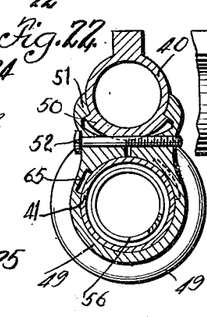
Figs. 22 and 23 are transverse sections, respectively, along lines 22—22 and 23—23 of Fig. 20.
Figure 23:
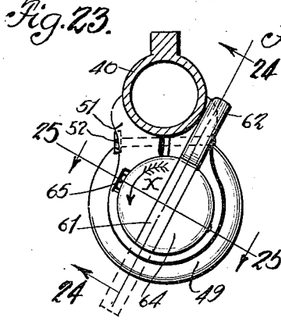
Figure 24:
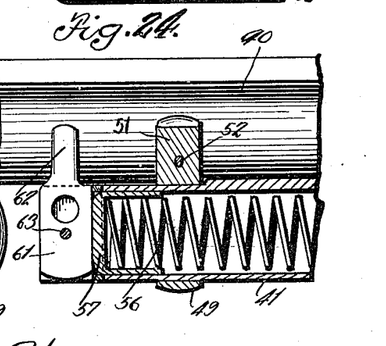
Fig. 24 is a longitudinal section along line 24—24 of Fig. 23.
Figure 25:
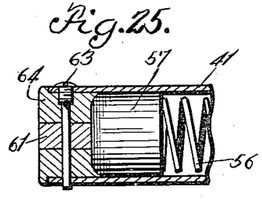
Fig. 25 a fragmentary section along line 25—25 of Fig. 23.
Figure 26:
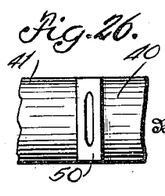
Fig. 26 is a fragmentary bottom plan view of the barrel at line 22—22.
Figure 27:
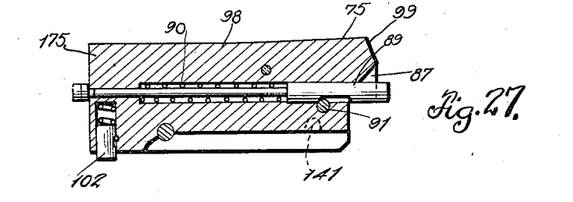
Fig. 27 a longitudinal section of the breech block.

In order to take down the gun, that is, to detach the barrel and the magazine from the receiver, it will thus be necessary to first swing the latch finger 62 forward against the action of the magazine spring 56 and free from the side of the barrel as in Fig. 21, then make a quarter turn with the barrel in the direction of arrow X, Fig. 23, thus disengaging the interrupted threads in socket 45. Simultaneously the long shank of the key 55 will register with the key-way 65, situated about 45° above the horizontal on the right side of the clip 49, see Figs. 22 and 23, thus permitting the axial displacement forward of the magazine tube 41 and complete withdrawal of its threaded end out of the receiver socket 45. The short shank 155 of the key now forms a stop against the rear face of the clip 49. By now turning the barrel 40 and the magazine 41, which form a unit, a quarter turn, the interrupted threads on the rear end of the barrel will disengage from the threads in socket 44. The barrel and magazine unit are thereby detached from the receiver 42.

The opposite order is followed in assembling the unit with the receiver. A stud 109 on the receiver 42 will then stop against the side of the recess 110 formed in the rear face of the band 46, see Figs. 28 and 30.

Figures 28, 29:
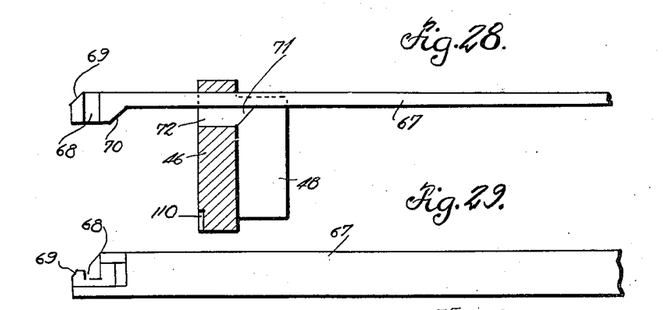
Fig. 28 is a horizontal section taken along line 28—28 of Fig. 30.
Fig. 29 is a side elevation of the rear end of the operating bar.
Figure 30:
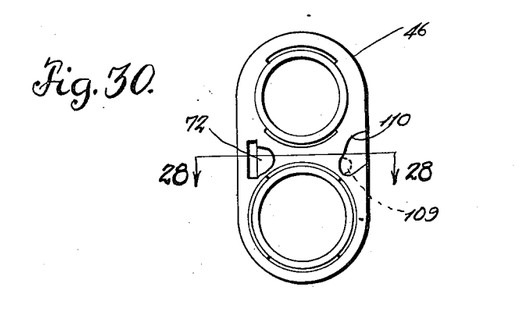
Fig. 30 is a rear end view of the barrel and magazine unit.

Around the magazine tube 41 is slidably mounted a wooden loading handle 66 to which is permanently secured a flat operating rod 67 the rear end of which is guided in a narrow opening 72 formed in the barrel band 46, see Figs. 28, 29 and 30. The operating rod terminates with an upwardly pointing hook 68 with beveled corners 69 and a forward shoulder 70. The rearward sliding movement of the loading handle 66 with the rod 67 is limited by the rear face of the handle striking the forward face of the extension sleeve 48, while its forward movement is limited by the hook-shoulder 70 abutting against the stop 71 on the sleeve 48. In this position the hook 68 is completely housed within the opening 72 in the band 46, which is necessary in order to permit the magazine to swing sideways around the axis of the barrel in detaching the barrel magazine unit from the carrier, that is, taking down the gun.

The connection between the operating rod 67 and the breech block or bolt 75 consists of a link or slide 76 formed at its forward end with a hook 78 adapted to engage with the corresponding hook 68 on the operating rod 67, see Figs. 7 to 14 and 27 to 29. A laterally acting latch spring 77 tends to retain the hooks in engagement. The slide is housed under a ledge 79 running along the left flat side of the breech block 75. The slide engages loosely with a pair of bevel faced lugs 80 and 81, by means of a side projection 82 with correspondingly beveled faces 83 and 84, thus permitting a slight longitudinal displacement and also a vertical tilting or rocking motion between the slide and the block.

A laterally projecting arm 85 engages the rear face of the block 75 to draw it forward during the loading operation. An upwardly extending finger 86 on the arm 85 simultaneously engages in a narrow slot 87 formed in the rear face of the block, while the block and the slide travel back and forth. In this position the finger 86 forming a safety has entered a side recess 88 in the rear end of the firing pin 89, which is held in its retracted position with its point inside the block by a spring 90, a stop 91 limiting its rearward movement. When the gun is loaded and ready to be fired, the rear end of the block is tilted up while the slide is held down governed by the bevels 81 and 84, thus retracting the finger 86 to permit the free forward movement of the firing pin 89 when struck by the hammer.

A pair of spring pressed extractors 95, 96 are hinged as at 97 in the breech block 75. These serve for extracting the empty cartridge case from the bore of the gun.

In the right side wall of the receiver is secured a flat spring 106 bent inward to engage behind the rim of the rearmost cartridge case in the magazine 41 when the mechanism is open, see Figs. 15 to 19. With the block 75 in forward position it engages the lip 107 thereby pushing the spring 106 to the side and setting the rearmost cartridge case free.

Figure 1:
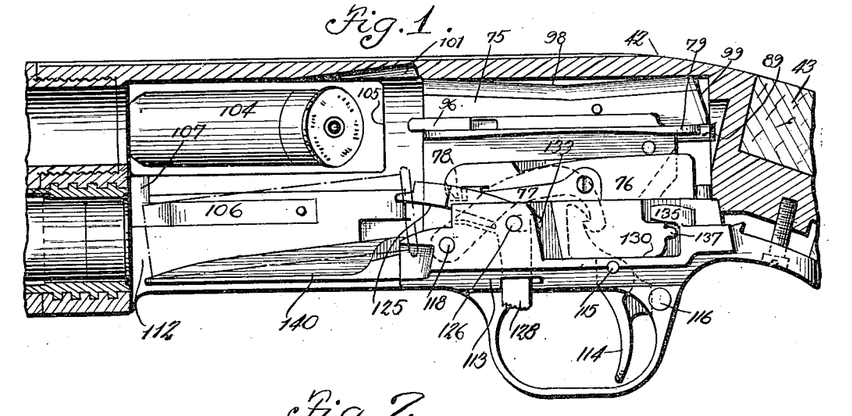
Fig. 1 is a longitudinal vertical section of the frame or receiver and a portion of the barrel with the mechanism in rearward position and the empty cartridge case extracted and swung out ready to drop.
Figure 2:
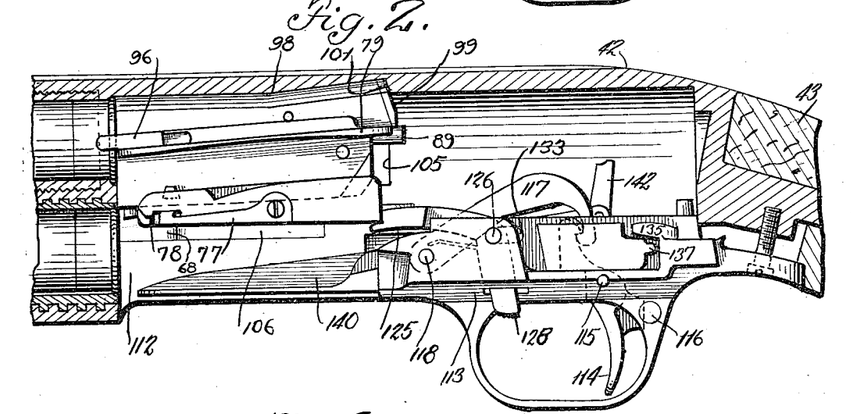
Fig. 2 a similar view showing the block locked in forward position, the gun loaded and cocked.
Figure 3:
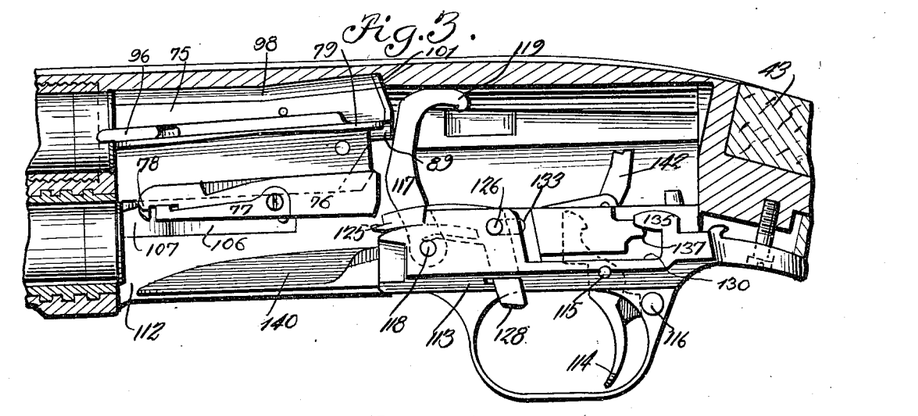
Fig. 3 a similar section with the hammer striking the firing pin.

The breech block 75 has a dent 98 in the middle of its back and a bevel face 99 in order to fit snugly under the roof 100 of the receiver 42 while the bevel face 99 abuts against the shoulder 101 formed in said roof, see Fig. 2. In this manner the firing shock is counteracted by said shoulder. A small spring actuated plunger 102 is furnished on the under side of the breech block 75, its function being to take hold of the cartridge freed by the spring catch 106 but still under the influence of the loading or magazine spring 56, the cartridge case thus partaking in the rearward movement of the block in loading.

During this rearward movement of the breech block 75 for reloading as actuated by the handle 66 through the operating rod 67 and the slide 76, the extractors 95, 96 firmly grip the rim of the empty cartridge case 104 holding it against the flat front face 175 of the block. When sufficiently retracted to be free of the bore of the barrel, the edge of the rim hits a lug 103 on the left wall of the receiver or carrier 42, see Figs. 1, 4 and 5, causing that side of the cartridge rim to be wrenched out of the grip of the left extractor 95 thus causing the case 104 to be swung out sideways to the right through the side openings or windows 105.

Figure 4:
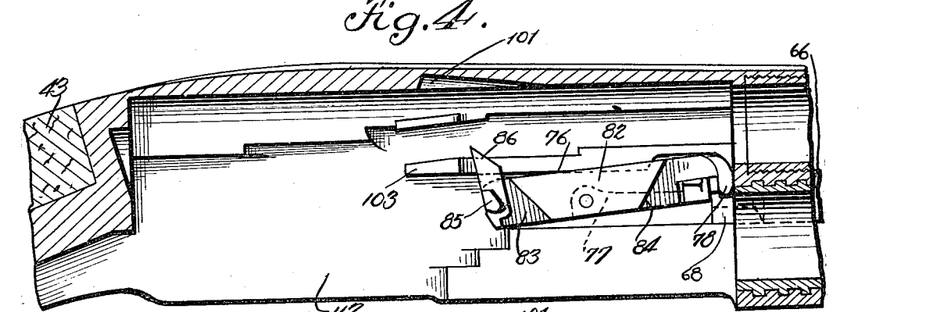
Fig. 4 is a similar section seen from the other side with the greater portion of the mechanism removed and showing the operator slide in forward, released position.
Figure 5:
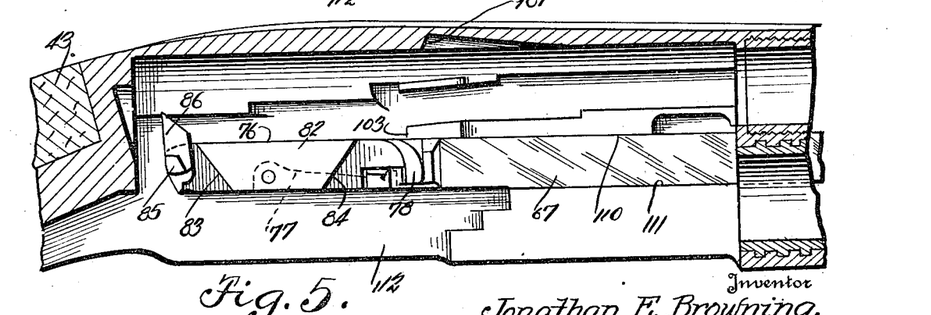
Fig. 5 a similar section to Fig. 4 showing the operator slide in rearward, safety position.
Figure 6:
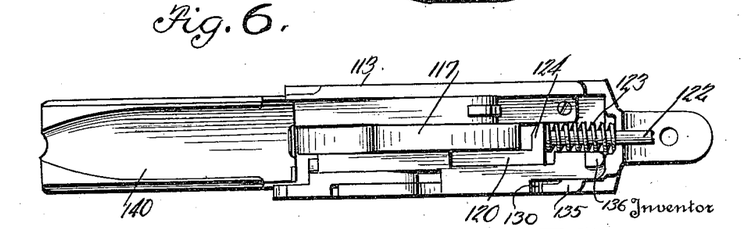
Fig. 6 is a top plan view of the trigger plate with the firing hammer.
Figure 7:
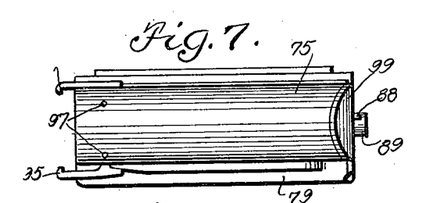
Figs. 7, 8 and 9 show top plan view, bottom plan view and rear end elevation respectively of the breech bolt or block.
Figure 8:
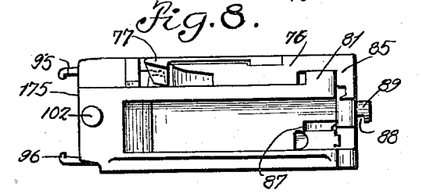
Figure 9:
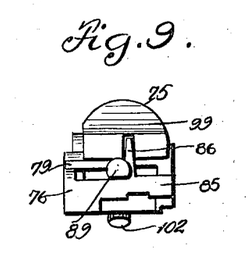
Figure 10:
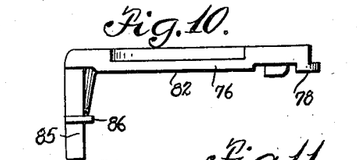
Figs. 10 and 11 respectively are top plan view and right side elevation of the operator slide.
Figure 31:
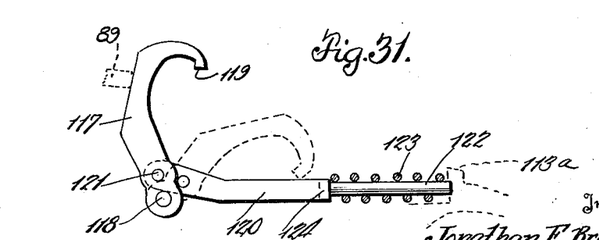
Fig. 31 is an elevation of the hammer in striking position, with dot and dash lines indicating its folded or housing position.

The receiver 42 is provided in its left side with a longitudinal groove between the upper and lower parellel edges of which 110 and 111 the operating bar 67 is guided, see Figs. 4 and 5. The entire bottom opening 112 of the receiver 42 is closed by the trigger plate 113 with its sundry parts of the mechanism as best seen in Figs. 1, 2, 3 and 6. The trigger 114 is pivoted as at 115 in said plate. A push button 116 acts as safety stop for the trigger. The L-shaped hammer 117 is pivoted on the pin 118 in the plate and reaches back with its hook 119 to engage the trigger 114. A hammer actuating rod 120 hinged to the hammer at 121 extends rearwardly in the trigger plate, its small cylindrical end 122 carries a compression spring 123 acting between a shoulder 124 on the rod 120 and the rear wall 113$^a$ of the trigger plate 113, see Fig. 31. When the trigger is pulled and releases the hammer the latter swings up striking the firing pin 89 actuated by the spring 123 through the rod 120.

Referring particularly to Figs. 1, 2, 3, 12 and 13 a slide stop 125 is shown pivoted in the trigger plate 113 on a pin 126. It is provided with a forward notch 127 adapted to engage the rear end of the slide 76. This takes place when the mechanism is in loaded position and the rear end 99 of the block is raised engaging the shoulder 101 in the receiver. In this manner the slide and the operating bar 67 are locked so that no accidental opening can take place while the gun is loaded. The slide 76 may be released by pulling back the depending finger 128 against the action of the spring 129 which is fixed in the slide stop 125 and rests with its free end on the pin 118 thereby tending to swing the notched end 127 into engagement with the slide 76.

Figures 11, 12:
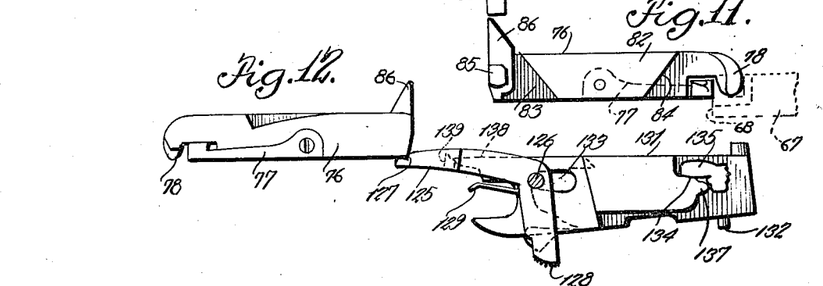
Figs. 12 and 13 show left side elevations of the inertia piece and the operator slide in locked and unlocked positions respectively.
Figures 13, 14:
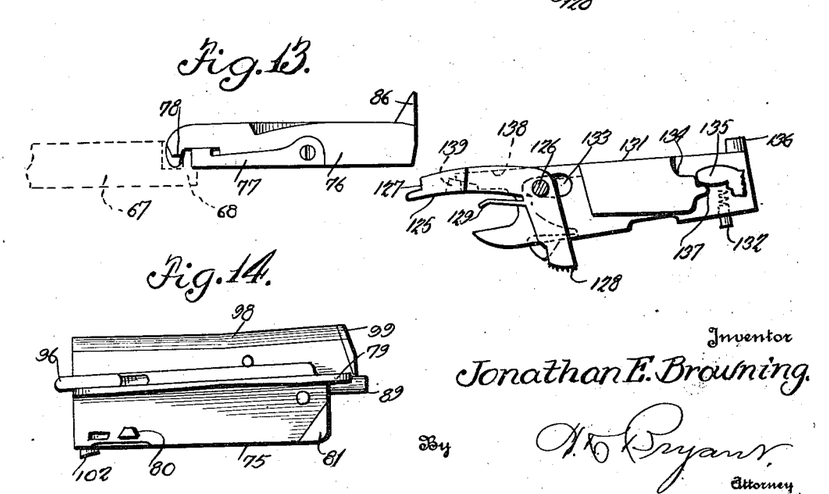
Fig. 14 is a left side elevation of the breech bolt or block.
Figure 15:
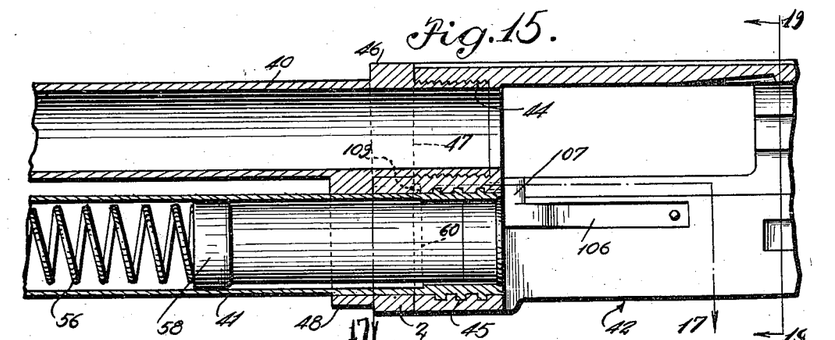
Fig. 15 is a longitudinal, vertical section of the joint between the frame or receiver and the barrel and magazine and with the frame empty.
Figure 16:
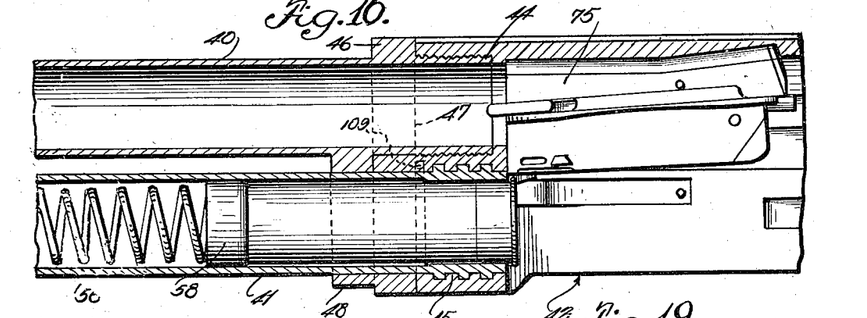
Fig. 16 a view similar to Fig. 15 with the breech block in firing position.
Figure 17:
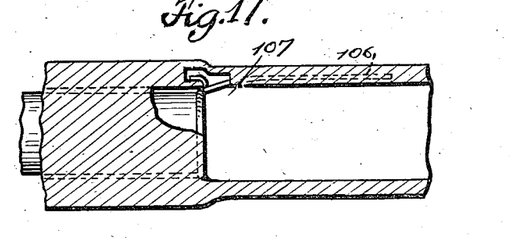
Fig. 17 a fragmentary longitudinal sectional view taken along line 17—17 of Fig. 15.
Figure 18:
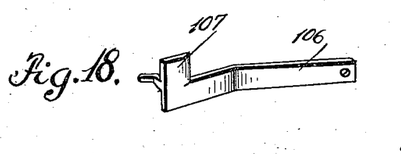
Fig. 18 is perspective view of a spring catch or retainer for a cartridge case in the magazine.
Figure 19:
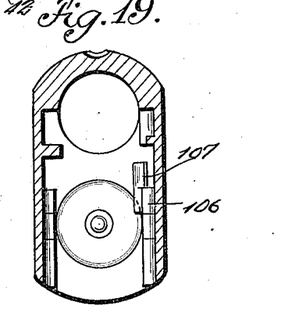
Fig. 19 is a vertical cross section taken along line 19—19 of Fig. 15.

In a recess 130 formed in the left side of the trigger plate 113 is lodged an automatically acting bolt or inertia piece 131 which is guided in a longitudinal groove in the bottom of the trigger plate 113 by a stud 132 on its under side and by an oblong transverse slot 133 engaging around the pin 126. In this manner the inertia piece will be able to perform a limited movement in longitudinal direction actuated by its inertia when the gun is fired. The top edge is stepped down as at 134 at the rear end of this bolt in order to engage under a ledge 135 in the trigger plate when in its rearmost position, see Figs. 1, 2, and 12, being pressed upwards against said ledge by the spring actuated stud 132. When the gun is fired the inertia of the piece 131 sends it forward disengaging the step 134 from under the ledge 135 with the consequence that the spring plunger or stud 132 lifts up the rear end of the inertia piece 131 until stopped by the second step 137 on said piece and engaging under the ledge. This causes a tilting down of the nose 138 on the inertia piece, which, in combination with its forward movement, causes the nose to engage with a small stud 139 of the slide stop 125. As a consequence the latter swings on its journal pin 126 until its forward notch 127 disengages the rear end of the slide 76 setting the latter free. This change is best seen in Figs. 12 and 13.

On the journal pin 126 for the slide stop 125 is also pivoted the lifting spoon shaped carrier 140 for the loaded cartridge case pushed out from the magazine by its operating spring 56. This carrier lies in horizontal position as in Fig. 1 with the new cartridge on top when the breech block is in its rearmost position. Directly the block starts forward, however, a notch 141 on its underside engages an upstanding finger 142 hinged at the rearmost end of the carrier 140. Through this finger the breech block 75 presses down the rear end of the carrier at the same time lifting its front end with the loaded cartridge case ready for entering the bore when pushed forward by the breech block. The latter when nearly home in closed position strikes the tip of the carrier 40 starting it downward, which motion is completed by a spring in the spoon or carrier. During the subsequent rearward movement of the block it again contacts with the finger 142 which, however, this time yields to the pressure, being only held upright by a spring in the carrier.

I claim:

1. In a repeating firearm the combination of a barrel and a magazine with a loading spring forming a permanent unit, the barrel having front and rear supports for the magazine, a receiver having sockets with interrupted threads for the ends of the barrel and magazine respectively, the magazine having limited slidable and rotative movement with regard to the barrel, and means for locking the unit in the receiver when in assembled position, said locking means including a front cap for said loading spring, a flat sided latch plate journalled in the magazine and having a projecting finger adapted to engage the side of the barrel in locked position, then the cooperation of said cap engaging one of said flat sides of the plate, actuated by the loading spring.

2. In a repeating firearm the combination of a barrel and a magazine with a loading spring forming a permanent unit, the barrel having front and rear supports for the magazine, a receiver having sockets with interrupted threads for the ends of the barrel and magazine respectively, the magazine having limited slidable and rotative movement with regard to the barrel, and means for locking the unit in the receiver when in assembled position, said locking means including a latch journaled in the magazine and controlled by the loading spring, said latch being adapted to contact with the barrel when the magazine is in assembled position in said receiver.

3. In a repeating firearm the combination of a barrel and a magazine with a loading spring forming a permanent unit, the barrel having front and rear supports for the magazine, a receiver having sockets with interrupted threads for the ends of the barrel and magazine respectively, the magazine having limited slidable and rotative movement with regard to the barrel, means for locking the unit in the receiver when in assembled position, said locking means including a key on the magazine abutting against the front support, a key-way adapted to register with said key when the magazine is unscrewed from the receiver, and a stop on the magazine adapted to cooperate with said front support to limit the axial displacement of the magazine when released from the receiver, said locking means also including a latch journaled in the magazine and controlled by the loading spring, said latch being adapted to contact with the barrel when the magazine is in assembled position in said receiver.

4. In a firearm, the combination of a receiver having a side opening, a unit detachably mounted thereon, said unit including a barrel, a magazine and reciprocating means slidably mounted on the magazine, a breech block in the receiver actuated by said means and provided with a downwardly directed plunger at its forward end adapted to engage behind a cartridge case freed from the magazine, a spring catch in the receiver engaging the rim of the rearmost cartridge case in the magazine with the mechanism open, said catch being adapted to free said rearmost cartridge case when actuated by the breech block in foremost position.

5. In a firearm the combination of a receiver having a side opening, a unit detachably mounted thereon, said unit including a barrel, a magazine and reciprocating means slidably mounted on the magazine, a breech block movable in the receiver and provided with a firing pin, a slide detachably connected with said means adapted to reciprocate in a suitable guide in said receiver, bevel faced elements on the block and slide loosely engaging to permit slight relative movement, a transversely directed arm on said slide engaging the rear end of the block and a safety finger on said arm engaging the firing pin in retracted position during reciprocation of the slide and block, said finger releasing the firing pin actuated by said elements by causing a relative vertical separation of the block and slide with the parts in firing position.

6. In a firearm the combination of a receiver having a side opening, a unit detachably mounted thereon, said unit including a barrel, a magazine and reciprocating means slidably mounted on the magazine, a breech block movable in the receiver and provided with a firing pin, a slide detachably connected with said means adapted to reciprocate in a suitable guide in said receiver, bevel faced elements on the block and slide loosely engaging to permit slight relative movement, a transversely directed arm on said slide engaging the rear end of the block, a locking device for the slide in firing position, and an inertia actuated member adapted to unlock the device upon firing of the gun.

7. In a firearm the combination of a receiver having a side opening, a unit detachably mounted thereon, said unit including a barrel, a magazine and reciprocating means slidably mounted on the magazine, a breech block movable in the receiver and provided with a firing pin, a slide detachably connected with said means adapted to reciprocate in a suitable guide in said receiver, bevel faced elements on the block and slide loosely engaging to permit slight relative movement, a transversely directed arm on said slide extending across and engaging the rear end of the block, a locking device for the slide in firing position, and an inertia actuated member adapted to unlock the device upon firing of the gun, said locking device comprising a spring actuated lever pivoted in the lower part of the receiver, and provided with a side projection adapted to be engaged by said inertia member to unlock the device, said reciprocating means adapted to retract said member from such engagement through cooperation with the breech block during rearward movement of the block.

8. In a firearm the combination of a receiver having a side opening, a unit detachably mounted thereon, said unit including a barrel, a magazine and reciprocating means slidably mounted on the magazine, a breech block movable in the reeciver and provided with a firing pin, a slide detachably connected with said means adapted to reciprocate in a suitable guide in said receiver, bevel faced elements on the block and slide loosely engaging to permit slight relative movement, a transversely directed arm on said slide engaging the rear end of the block, a locking device for the slide in firing position, and an inertia actuated member adapted to unlock the device upon firing of the gun, said locking device comprising a spring actuated lever pivoted in the lower part of the receiver, and provided with a side projection adapted to be engaged by said inertia member to unlock the device, said reciprocating means adapted to retract said member from such engagement through cooperation with the breech block during rearward movement of the block, and a ledge in the receiver adapted to retain said member in retracted position.

9. In a repeating firearm the combination of a barrel and a magazine with a loading spring forming a permanent unit, the barrel having front and rear supports for the magazine, a receiver having sockets with interrupted threads for the ends of the barrel and magazine respectively, the magazine having limited slidable and rotative movement with regard to the barrel, and means for locking the unit in the receiver when in assembled position; said front support comprising a shoulder on the barrel having end surfaces directed radially from the barrel, a clip fitting around the magazine, jaws on the clip each extending less than a quarter circle up on the barrel adapted to grip said radial surfaces and clamping means drawing said jaws together.

10. In a repeating firearm, the combination of a barrel and a magazine with a loading spring forming a permanent unit, the barrel having front and rear supports for the magazine; said front support comprising a shoulder on the barrel having end surfaces directed radially from the barrel, a clip fitting around the magazine, jaws on the clip, each extending less than a quarter circle up on the barrel adapted to grip said radial surfaces and clamping means drawing said jaws together.

In testimony whereof I affix my signature.

JONATHAN E. BROWNING.